United States Patent [19]

Omura et al.

[11] Patent Number: 5,767,996
[45] Date of Patent: Jun. 16, 1998

[54] OPTICAL TRANSMISSION SYSTEM

[75] Inventors: Hideyuki Omura, Chigasaki; Nozomu Matsuo, Yokohama; Yukihisa Shinoda, Kawasaki, all of Japan

[73] Assignees: The Electric Co., Ltd.; The Tokyo Electric Power Company, Inc., both of Tokyo, Japan

[21] Appl. No.: 587,574

[22] Filed: Jan. 17, 1996

[30] Foreign Application Priority Data

Jan. 17, 1995 [JP] Japan .................. 7-004861

[51] Int. Cl.$^6$ .................................... H04J 14/06
[52] U.S. Cl. .................. 359/122; 359/133; 359/156
[58] Field of Search .................... 359/122, 124, 359/125, 133, 156, 173, 179, 188, 195, 165

[56] References Cited

U.S. PATENT DOCUMENTS 5,541,758 7/1996 Matsuo et al. ............. 359/133
5,589,969 12/1996 Taga et al. ............. 359/133

Primary Examiner—Kinfe-Michael Negash
Attorney, Agent, or Firm—Jacobson, Price, Holman & Stern, PLLC

[57] ABSTRACT

There is provided an optical transmission system that can identify any transmitting stations generating optical beats found within the transmission band being used for optical signals so that any degradation in the quality of the signals being transmitted and adversely affected by the optical beats may be eliminated. The light sources of the transmitting stations giving rise to the optical beats generated in the detector as a result of the differences of the wavelengths of the optical signals coming from the light sources of the transmitting stations and adversely affecting the transmission band being used for the electric signals originating the modulated optical signals are identified by changing the state of polarization of light of the optical signals coming from the light sources of the plurality of transmitting stations. In other words, the light sources of the transmitting stations that are giving rise to the optical beats adversely affecting the transmission band being used for the electric signals originating the modulated optical signals can be identified by changing the state of polarization of light of the optical signals coming from the light sources of the transmitting stations on a one-by-one basis and observing the produced optical beat at the receiving station.

7 Claims, 6 Drawing Sheets

OPTICAL TRANSMISSION SYSTEM

BACKGROUND OF THE INVENTION

1. Field of the Invention

This invention relates to an optical transmission system such as an optical CATV system, an optical ITV system or a system comprising optical transmission monitors.

2. Description of the Related Art

When a plurality of optical signals having different wavelengths are transmitted as multiplexed signals via an optical transmission system such as an optical CATV system, an optical ITV system of a system comprising optical transmission monitors and received by an optical detector of a receiving station, optical beats can be generated as a result of the differences of the wavelengths of the optical signals to significantly damage the quality of the signals.

This phenomenon will be described by referring to FIG. 6 of the accompanying drawings, which shows a number of transmitting stations 31 connected to a single optical fiber in order to transmit video signals.

Each of the transmitting stations 31 modulates the electric video signal it is going to transmit by means of a modulator 33 and converts it into an optical signal by means of an E/O converter 35 (e.g. LD) before the signal is combined with other signals being transmitted from other stations by means of an optical coupler 37 and put on an optical transmission line 39. The optical signals on the optical transmission line 39 proceeds to a receiving station 41, where they are detected and converted back into electric video signals by a detector 43 (e.g., PD) and distributed by a distributor 45 to respective demodulators 47, each of which demodulates the received signal and displays it on a monitor 49.

In a multiplex optical transmission system for transmitting a plurality of optical signals by way of a single optical transmission line as described above, optical beats can be generated as a result of interaction of the optical signals having different wavelengths at a detector.

Optical transmission systems are generally designed to use wavelengths of light for its signal transmission band that would not generate optical beats that can significantly and adversely affect the quality of the optical signals they transmit. However, different wavelengths may become involved with time for some reason or other to generate optical beats that can adversely affect the signal quality.

When an optical beat is generated in an optical detector in a frequency band that is being used by an optical signal coming from an E/O converter, it can significantly deteriorate the signal quality as the noise level of the transmission system rises due to the optical beat.

In an optical transmission system that transmits multiplexed optical signals by way of a single optical fiber as described above, the optical signals cannot be separated from each other and hence their originating stations cannot be identified before they are converted back into electric signals. This means that, if an optical beat is generated, it is difficult to identify the transmitting station that is transmitting the signal causing the beat generation.

It is therefore the object of the present invention to provide an optical transmission system that can identify the transmitting station involved in an optical beat generated in the transmission band of the system and identify the terminal causing the beat generation of the system.

SUMMARY OF THE INVENTION

According to the present invention, the above object is achieved by an optical transmission system as described blow.

According to the present invention, there is provided an optical transmission system comprising a plurality of transmitting stations having respective light sources for transmitting respective modulated optical signals by way of a single optical fiber and a receiving station having a detector for detecting the optical signals and converting the optical signals to radio frequency (RF) signals, and a distributor for distributing the RF signals to respective demodulators, characterized in that the light sources of the transmitting stations giving rise to the optical beats generated in the detector as a result of the differences of the wavelengths of the optical signals coming from the light sources of the transmitting stations and adversely affecting the transmission band being used for the electric signals originating the modulated optical signals are identified by changing the polarization state of the optical signals coming from the light sources of the plurality of transmitting stations.

In a preferred mode of carrying out the invention, the light sources of the transmitting stations giving rise to the optical beats generated in the detector as a result of the differences of the wavelengths of the optical signals coming from the light sources of the transmitting stations and adversely affecting the transmission band being used for the electric signals originating the modulated optical signals are identified by changing the polarization state of the optical signals coming from the light sources of the plurality of transmitting stations by means of a magnetic field.

In another preferred mode of carrying out the invention, the light sources of the transmitting stations giving rise to the optical beats generated in the detector as a result of the differences of the wavelengths of the optical signals coming from the light sources of the transmitting stations and adversely affecting the transmission band being used for the electric signals originating the modulated optical signals are identified by changing the state of polarization of light of the optical signals coming from the light sources of the plurality of transmitting stations by means of a polarization modulator.

In still another preferred mode of carrying out the invention, the light sources of the transmitting stations giving rise to the optical beats generated in the detector as a result of the differences of the wavelengths of the optical signals coming from the light sources of the transmitting stations and adversely affecting the transmission band being used for the electric signals originating the modulated optical signals are identified by changing the polarization state of the optical signals coming from the light sources of the plurality of transmitting stations by applying a vibration to the optical fiber.

Once the light sources of the transmitting stations giving rise to the optical beats generated in the detector as a result of the differences of the wavelengths of the optical signals coming from the light sources of the transmitting stations and adversely affecting the transmission band being used for the electric signals originating the modulated optical signals are identified by changing the state of polarization of light of the optical signals coming from the light sources of the plurality of transmitting stations, the optical beats may be made not to adversely affect the transmission band by changing the wavelengths of the light sources of the identified transmitting stations.

Preferably, the plurality of transmitting stations and the receiving station may be linked together by way of bidirectional optical fibers so that the operation of changing the state of polarization of light of the light sources of the transmitting stations and that of changing the wavelengths of the light sources of the transmitting stations are conducted by using the optical fibers in the direction from the receiving station to the transmitting stations, whereas the operation of detecting changes in the polarization state of the light sources of the transmitting stations is conducted by using the optical fibers in the direction from the transmitting stations to the receiving station.

An optical transmission system comprising a plurality of transmitting stations having respective light sources for transmitting respective modulated optical signals by way of a single optical fiber and a receiving station having a detector for detecting the optical signals and a distributor for distributing the optical signals to respective demodulators according to the invention and characterized in that the light sources of the transmitting stations giving rise to the optical beats generated in the detector as a result of the differences of the wavelengths of the optical signals coming from the light sources of the transmitting stations and adversely affecting the transmission band being used for the electric signals originating the modulated optical signals are identified by changing the polarization state of the optical signals coming from the light sources of the plurality of transmitting stations has the following effects.

An optical beat is generated as a function of the difference of the wavelengths of any two light sources and the level of the optical beat is defined by the relationship between the polarization state of the optical signals that interfere with each other as illustrated in FIG. 5.

Thus, the level of an optical beat is changed by changing the state of polarization of the optical signals and, therefore, the light sources of the transmitting stations that are giving rise to the optical beats adversely affecting the transmission band being used for the electric signals originating the modulated optical signals can be identified by changing the polarization state of the optical signals coming from the light sources of the plurality of transmitting stations.

In other words, the light sources of the transmitting stations that are giving rise to the optical beats adversely affecting the transmission band being used for the electric signals originating the modulated optical signals can be identified by changing the polarization state of the optical signals coming from the light sources of the transmitting stations on a one-by-one basis and observing the produced optical beat at the receiving station.

The state of polarization of light of the optical signals coming from the light sources of the plurality of transmitting stations may be changed in a simple manner by means of a magnetic field.

Alternatively, the polarization state of the optical signals coming from the light sources of the plurality of transmitting stations may be changed also in a simple manner by means of a polarization state modulator.

Still alternatively, the polarization state of the optical signals coming from the light sources of the plurality of transmitting stations may be changed also in a simple manner by applying a vibration to the optical fiber.

The light sources of the transmitting stations that are giving rise to the optical beats adversely affecting the transmission band being used for the electric signals originating the modulated optical signals may alternatively be identified by changing the polarization state of the optical signals coming from the light sources of the transmitting stations on a simultaneous basis and observing the produced optical beat at the receiving station, if a vibration is applied to the optical fiber with a frequency that varies depending on the transmitting stations.

According to a preferred mode of carrying out the invention, once the light sources of the transmitting stations giving rise to the optical beats generated in the detector as a result of the differences of the wavelengths of the optical signals coming from the light sources of the transmitting stations and adversely affecting the transmission band being used for the electric signals originating the modulated optical signals are identified by changing the polarization state of the optical signals coming from the light sources of the plurality of transmitting stations, the optical beats may be made not to adversely affect the transmission band by changing the wavelengths of the light sources of the identified transmitting stations. Thus, in an optical transmission system originally designed to use wavelengths of light for its signal transmission band that would not generate optical beats that can significantly and adversely affect the quality of the optical signals they transmit but different wavelengths have become involved with time for some reason or other to generate optical beats that can adversely affect the signal quality, the optical beats may be made not to adversely affect the transmission band by changing the wavelengths of the light sources of the identified transmitting stations as at the time when the transmission system was designed.

If, preferably, the plurality of transmitting stations and the receiving station are linked together by way of bidirectional optical fibers so that the operation of changing the state of polarization of light of the light sources of the transmitting stations and that of changing the wavelengths of the light sources of the transmitting stations are conducted by using the optical fibers in the direction from the receiving station to the transmitting stations, whereas the operation of detecting changes in the state of polarization of light of the light sources of the transmitting stations is conducted by using the optical fibers in the direction from the transmitting stations to the receiving station, the receiving station can collectively perform the operation of changing the state of polarization of light of the light sources of the transmitting stations and that of changing the wavelengths of the light sources of the transmitting stations.

DETAILED DESCRIPTION OF THE PREFERRED EMBODIMENTS

Now, the present invention will be described by referring to the accompanying drawings that illustrate preferred embodiments of the invention.

Embodiment 1

Figure 1:
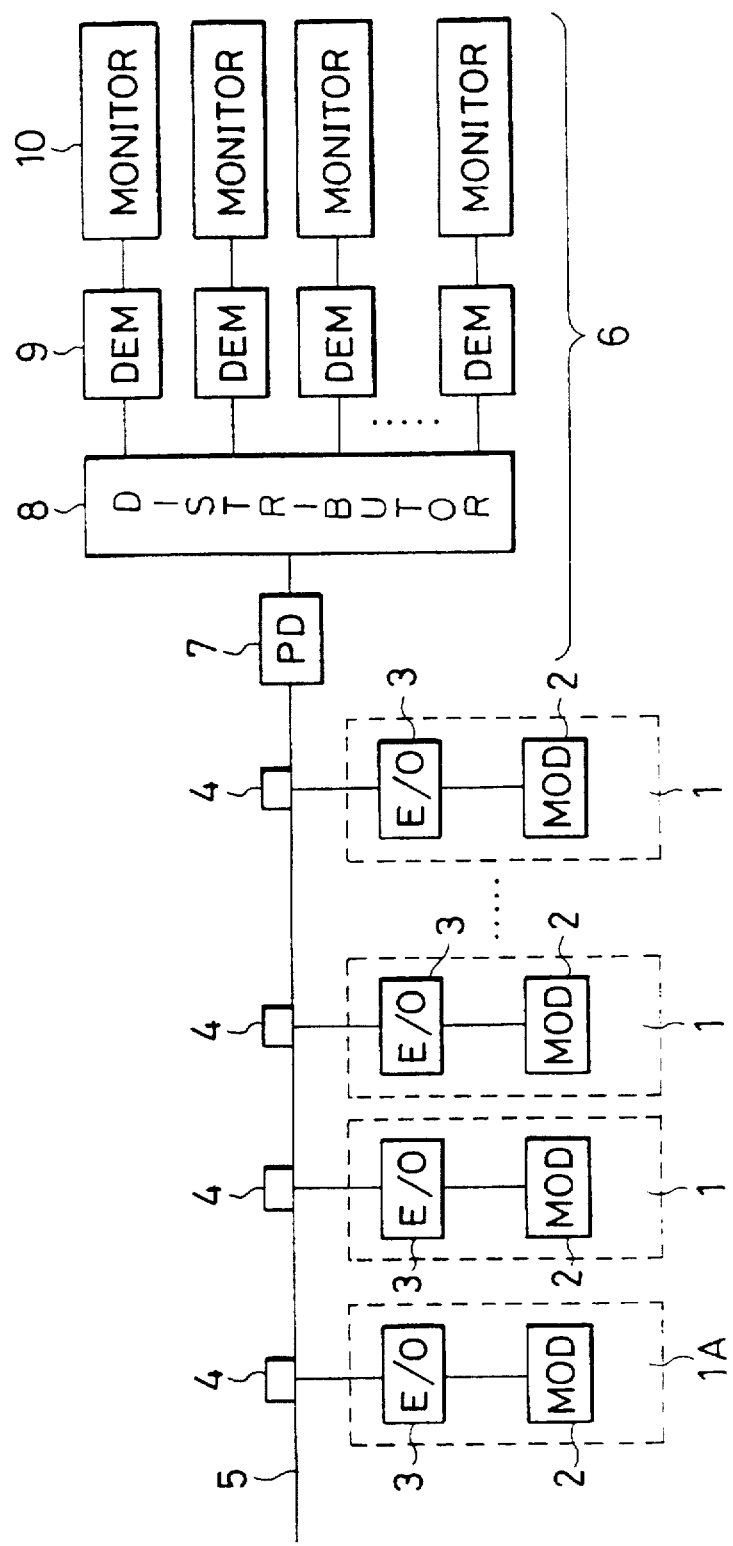
FIG. 1 is a schematic circuit diagram of a preferred embodiment of optical transmission system according to the invention.
Figure 2:
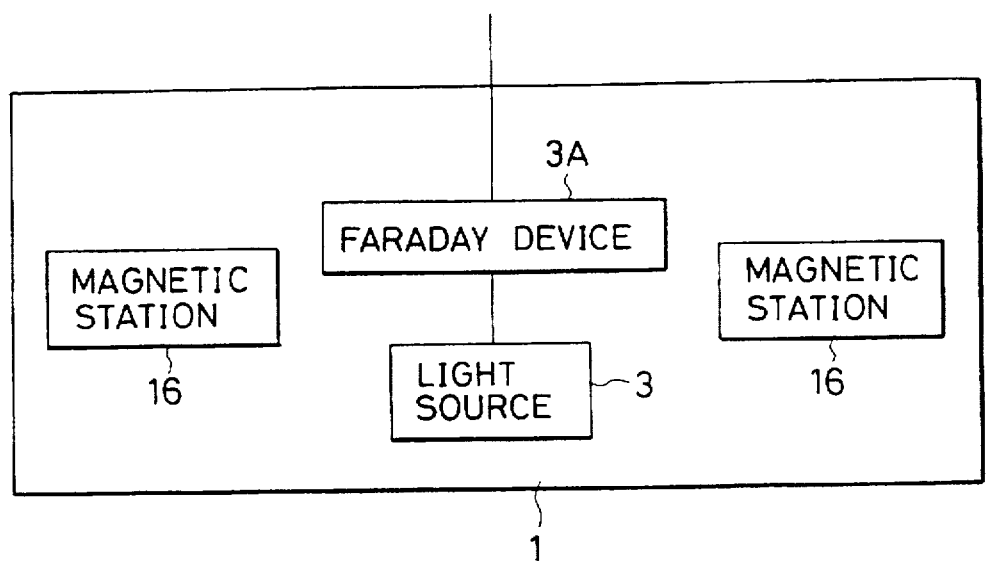
FIG. 2 is a schematic diagram of a transmitting station that can be used for the embodiment of FIG. 1.

FIGS. 1 and 2 illustrate a first embodiment of optical transmission system according to the invention.

An electric signal, e.g., an electric video signal, to be transmitted from each of the transmitting stations 1 of the system is modulated by a modulator 2 for the intensity and converted into an optical signal by an E/O converter 3 (e.g., LD) before it is added by means of an optical coupler 4 to the optical signals coming from the other transmitting stations of the system and being transmitted along an optical transmission line 5. The optical signals then proceed further along the optical transmission line 5 to the receiving station 6, where they are detected and converted back into electric signals by a detector 7 (e.g., PD), which are then distributed by a divider 8 to respective demodulators 9 and displayed on respective monitors 10. This arrangement is not different from that of a conventional system.

However, each of the transmitting stations 1 comprises a polarizer 3A comprising a Faraday element for polarizing the polarization plane emitted from a light source or an E/O converter 3 so that the signal from the transmitting station is modulated for the polarization plane. A pair of magnetic generators (for generating magnetic fields) 16 are oppositely arranged on the lateral sides of the plane of polarization polarizer 3A. As magnetic fields are generated by the magnetic generators, the polarizer 3A comprising a Faraday element is changed. Since the peak level of an optical beat varies as a function of the condition between the polarization planes of optical signals that interfere with each other, the optical beat is reduced practically to a null level if the optical signals are linearly polarized and the polarization planes are separated from each other by a right angle.

Assume now that the E/O converter 3 of a transmitting station 1A generates an optical beat that adversely affects the transmission band being used for optical signals.

An optical signal from the E/O converter 3 of each of the transmitting stations including the transmitting station 1A is transmitted to the optical transmission line 5 by way of an optical coupler 4.

The optical signals on the optical transmission line is then detected simultaneously by a detector 7 and applied to respective demodulators 9. Then, an optical beat is generated at the detector 7 between the optical signal from the E/O converter 3 of the transmitting station 1A and an optical signal having a frequency that differs from that of the first optical signal by an amount corresponding to the wavelength of the first optical signal.

When such an optical beat appears, the E/O converter 3 of the transmitting station 1A is identified as the source of the optical beat that is adversely affecting the transmission band being used for optical signals when of the plane of polarization polarizer 3A comprising a Faraday element is changed by generating magnetic fields by means of the magnetic stations 16 in the transmitting station 1A because the level of the optical beat changes in the detector 7.

If, on the other hand, the E/O converter 3 of the transmitting station 1A is not the source of the optical beat currently observed in the detector, the real source of the optical beat can be identified by generating magnetic fields by means of the magnetic stations 16 in the transmitting stations 1 of the system on a one-by-one basis.

Thereafter, the degraded quality of signal transmission can be improved by shifting the central wavelength of the optical beat into a range that does not adversely affect the transmission band being used for optical signals by controlling the wavelength of the E/O converter 3 of the transmitting station 1 that is the real source of the optical beat.

Embodiment 2

Figure 3:
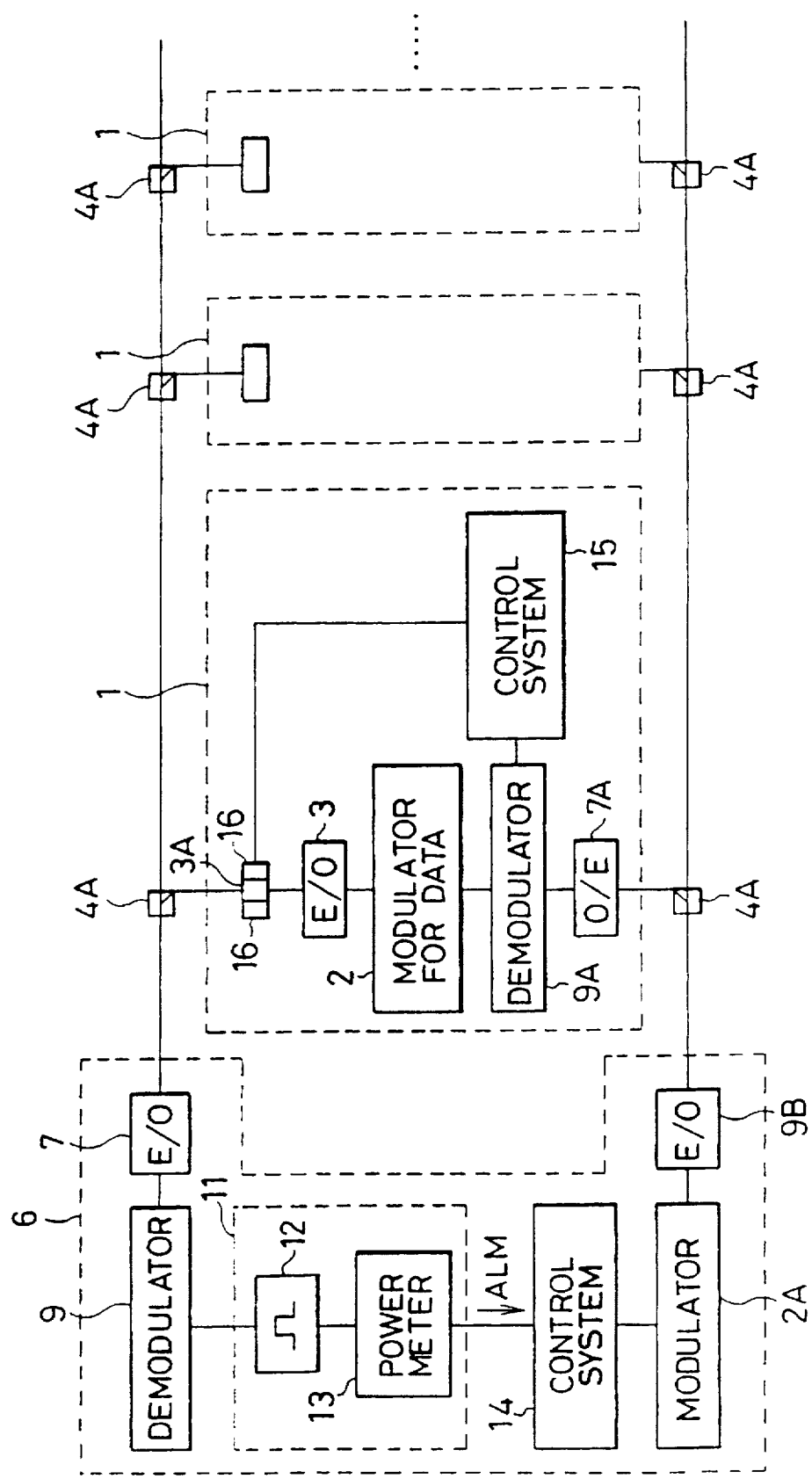
FIG. 3 is a schematic circuit diagram of another preferred embodiment of optical transmission system according to the invention.

FIG. 3 illustrates a second embodiment of optical transmission system according to the invention.

An electric signal, e.g., an electric video signal, to be transmitted from each of the transmitting stations 1 of the system is modulated by a modulator 2 for signal intensity and converted into an optical signal by an E/O converter 3 (e.g., LD) before it is added by means of an optical coupler 4 to the optical signals coming from the other transmitting stations of the system and being transmitted along an optical transmission line 5. The optical signals then proceed further along the optical transmission line 5 to the receiving station 6, where they are detected and converted back into electric signals by a detector 7 (e.g., PD), which are then distributed by a divider 8 to respective demodulators 9 and displayed on respective monitors 10. This arrangement is not different from that of the above described first embodiment.

Note that, since all the transmitting stations of the second embodiment have a same and identical configuration, only one of the transmitting stations is illustrated in detail.

This embodiment is characterized by that it comprises an optical beat detecting system 11 having a band path filter 12 and a power meter to constantly monitor the optical signals demodulated by the demodulators 9 of the receiving station 6 and the level of any detected optical beat that is found within the frequency band of a subcarrier.

If the level of the detected optical beat exceeds a predetermined value, an alarm signal is issued from the optical beat detecting system 11 to a control system 14, which, upon receiving the signal, transmits a drive signal for driving at least a pair of magnetic stations 16 arranged in the E/O converters 3 of the transmitting stations 1 by way of a down-link optical transmission line 5A.

The electric signal to be transmitted from the receiving station 6 is modulated by a modulator for signal intensity and converted into an optical signal by means of an E/O converter 3B (e.g., LD) before it is transmitted through the down-link optical transmission line 5A.

The drive signal transmitted by way of the down-link optical transmission line 5A is branched by the optical coupler 4A of each of the transmitting stations and detected by a detector 7A (e.g., PD) in each of the transmitting station 1. Reference numeral 9A in FIG. 3 denotes a demodulator.

The drive signal transmitted through the down-link optical transmission line 5A causes the magnetic stations 16 of each of the transmitting stations 1 to generate magnetic fields which by turn changes the plane of polarization of the plane of polarization polarizer 3A comprising a Faraday device to change the level of any optical beat observed in the specific transmitting station so that the receiving station 6 can identify the source of an optical beat that is found within the transmission band being used for the transmitting stations 1 of the optical transmission system.

Once the specific transmitting station 1 that is the source of the optical beat found within the transmission band being used for the transmitting stations 1 of the optical transmission system is identified, a signal is transmitted to the transmitting station 1 by way of the downlink optical transmission line 5A to control the temperature of the E/O converter 3 of the station for generating signals so that the central wavelength of the optical beat may be shifted into a range that does not adversely affect the transmission band. In short, this embodiment utilizes the phenomenon that the central wavelength of the signal from a light source changes as a function of the transmission temperature.

Reference numeral 15 in FIG. 3 denotes a control system for arranged for the pair of magnetic stations 16 of each transmitting station 1.

It may be understood that the central wavelength of the signal from a light source may be changed by changing using a variable wavelength light source instead of changing the transmission temperature of the light source.

Embodiment 3

Figure 4:
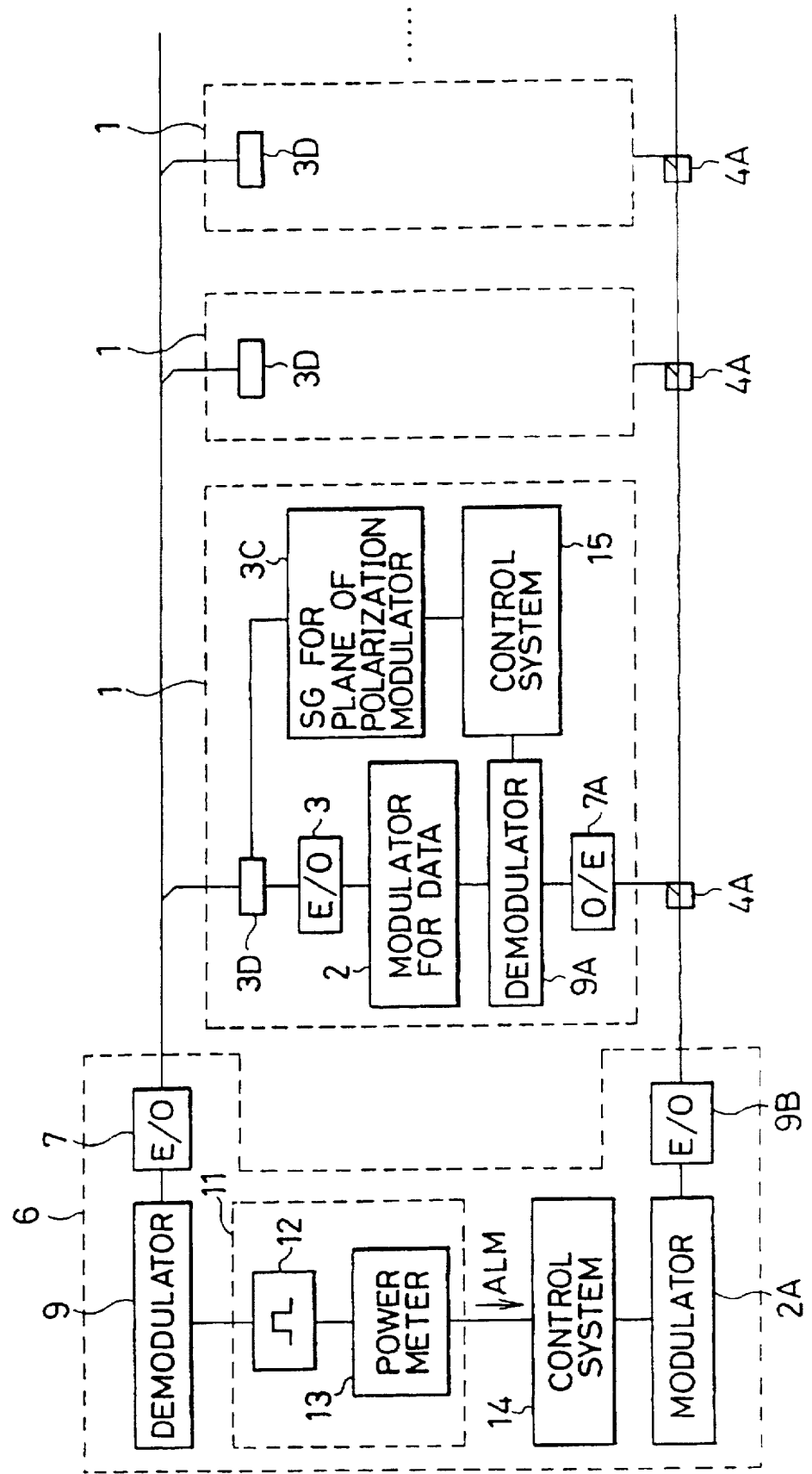
FIG. 4 is a schematic circuit diagram of still another preferred embodiment of optical transmission system according to the invention.

While the plane of polarization of each polarizer comprising a Faraday element is changed by applying magnetic fields generated by a pair of magnetic stations in each transmitting station in the above described first and second embodiments, the plane of polarization may alternatively be changed by means of a plane of polarization modulator 3D that applied a vibration of the optical fiber of the optical transmission system as shown in FIG. 4.

In FIG. 4, reference symbol 3C denotes a plane of polarization modulating SG that transmits a vibration signal to the plane of polarization modulator 3D. Otherwise, the embodiment is identical with the second embodiment and hence it will not be described any further.

By changing the frequency of the vibration to be applied to the optical fiber for each of the transmitting station, the transmitting station generating an optical beat found within the transmission band being used for signal transmission can be identified from the change in the level of the optical beat if the planes of polarization of all the light sources of the transmitting stations are changed simultaneously.

Advantages of the Invention

As described above in detail, an optical transmission system comprising a plurality of transmitting stations having respective light sources for transmitting respective modulated optical signals by way of a single optical fiber and a receiving station having a detector for detecting the optical signals and converting the optical signals to radio frequency (RF) signals, and a distributor for distributing the RF signals to respective demodulators according to the invention and characterized in that the light sources of the transmitting stations giving rise to the optical beats generated in the detector as a result of the differences of the wavelengths of the optical signals coming from the light sources of the transmitting stations and adversely affecting the transmission band being used for the electric signals originating the modulated optical signals are identified by changing the state of polarization of light of the optical signals coming from the light sources of the plurality of transmitting stations has the following effects.

Figure 5:
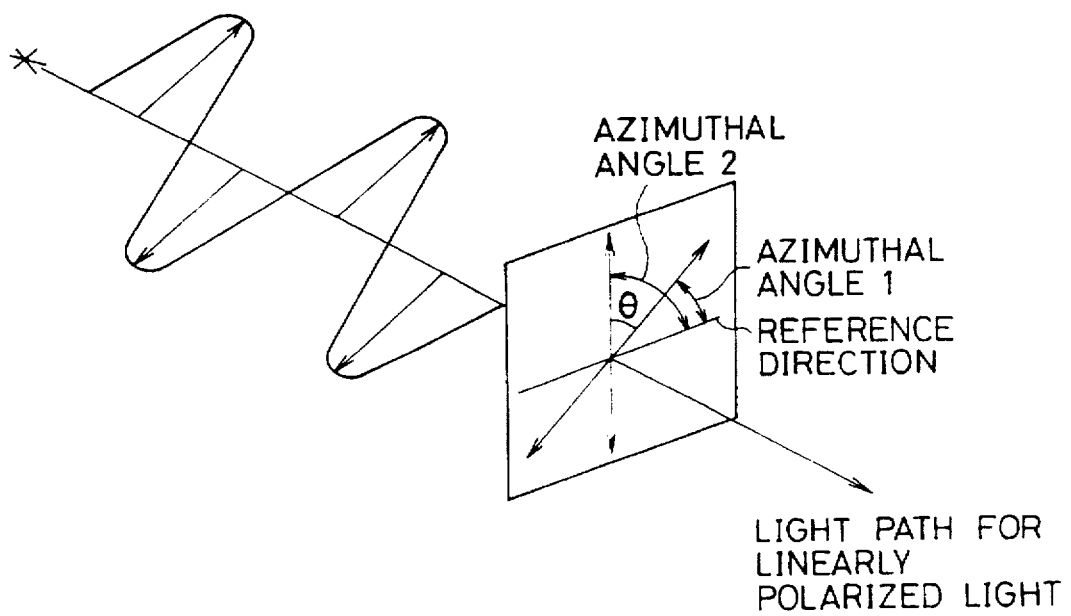
FIG. 5 is a schematic view illustrating how the level of an optical beat is changed by changing the plane of polarization.
Figure 6:
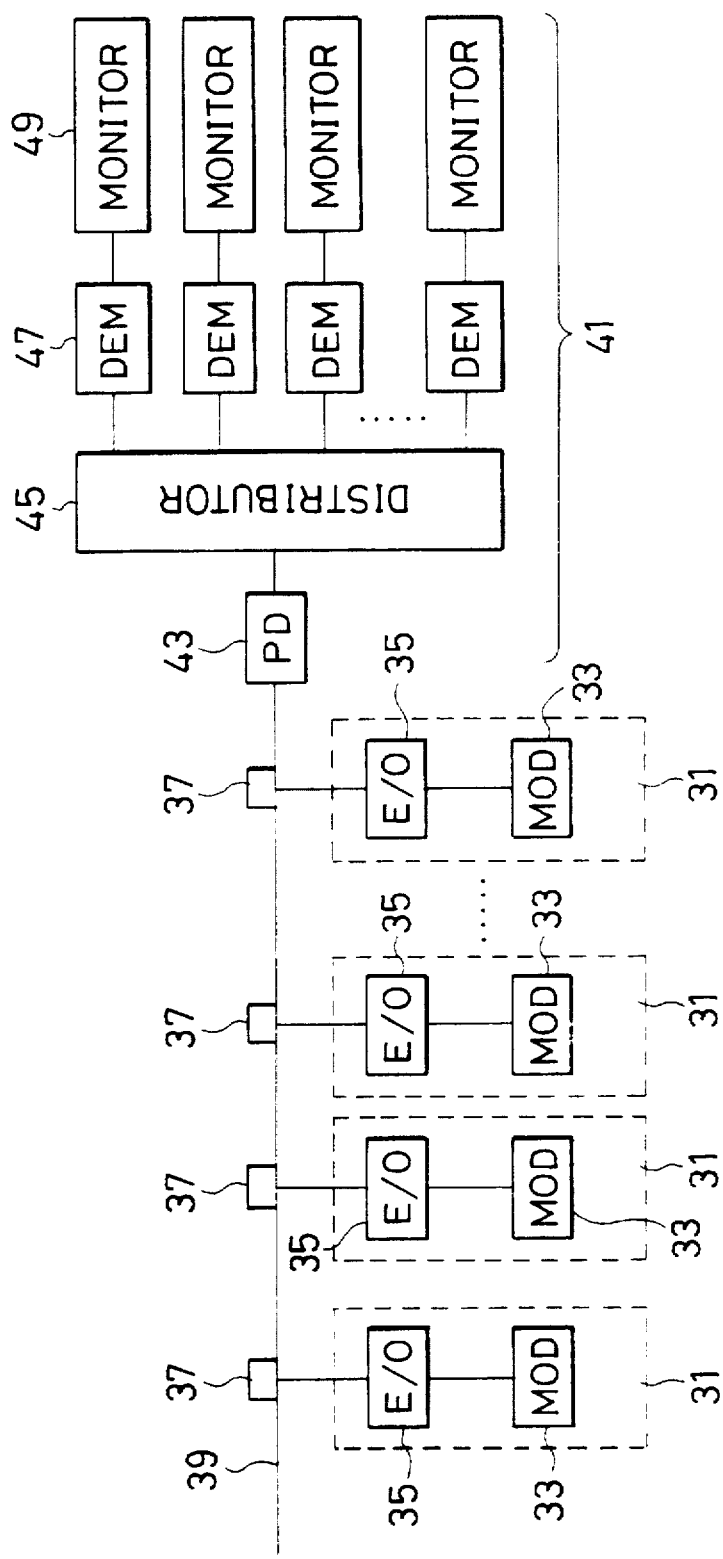
FIG. 6 is a schematic circuit diagram of a conventional optical transmission system.

An optical beat is generated as a function of the difference of the wavelengths of any two light sources and the level of the optical beat is defined by the relationship between the planes of polarization of the optical signals that interfere with each other as illustrated in FIG. 5.

Thus, the level of an optical beat is changed by changing the state of polarization of the optical signals and, therefore, the light sources of the transmitting stations that are giving rise to the optical beats adversely affecting the transmission band being used for the electric signals originating the modulated optical signals can be identified by changing the state of polarization of light of the optical signals coming from the light sources of the plurality of transmitting stations.

In other words, the light sources of the transmitting stations that are giving rise to the optical beats adversely affecting the transmission band being used for the electric signals originating the modulated optical signals can be identified by changing the state of polarization of light of the optical signals coming from the light sources of the transmitting stations on a one-by-one basis and observing the produced optical beat at the receiving station.

The state of polarization of light of the optical signals coming from the light sources of the plurality of transmitting stations may be changed in a simple manner by means of a magnetic field.

Alternatively, the state of polarization of light of the optical signals coming from the light sources of the plurality of transmitting stations may be changed also in a simple manner by means of a plane of polarization modulator.

Still alternatively, the state of polarization of light of the optical signals coming from the light sources of the plurality of transmitting stations may be changed also in a simple manner by applying a vibration to the optical fiber.

The light sources of the transmitting stations that are giving rise to the optical beats adversely affecting the transmission band being used for the electric signals originating the modulated optical signals may alternatively be identified by changing the state of polarization of light of the optical signals coming from the light sources of the transmitting stations on a simultaneous basis and observing the produced optical beat at the receiving station, if a vibration is applied to the optical fiber with a frequency that varies depending on the transmitting stations.

According to a preferred mode of carrying out the invention, once the light sources of the transmitting stations giving rise to the optical beats generated in the detector as a result of the differences of the wavelengths of the optical signals coming from the light sources of the transmitting stations and adversely affecting the transmission band being used for the electric signals originating the modulated optical signals are identified by changing the state of polarization of light of the optical signals coming from the light sources of the plurality of transmitting stations, the optical beats may be made not to adversely affect the transmission band by changing the wavelengths of the light sources of the identified transmitting stations. Thus, in an optical transmission system originally designed to use wavelengths of light for its signal transmission band that would not generate optical beats that can significantly and adversely affect the quality of the optical signals they transmit but different wavelengths have become involved with time for some reason or other to generate optical beats that can adversely affect the signal quality, the optical beats may be made not to adversely affect the transmission band by changing the wavelengths of the light sources of the identified transmitting stations as at the time when the transmission system was designed.

If, preferably, the plurality of transmitting stations and the receiving station are linked together by way of bidirectional optical fibers so that the operation of changing the state of polarization of light of the light sources of the transmitting stations and that of changing the wavelengths of the light sources of the transmitting stations are conducted by using the optical fibers in the direction from the receiving station to the transmitting stations, whereas the operation of detecting changes in the state of polarization of light of the light sources of the transmitting stations is conducted by using the optical fibers in the direction from the transmitting stations to the receiving station, the receiving station can collectively perform the operation of changing the state of polarization of light of the light sources of the transmitting stations and that of changing the wavelengths of the light sources of the transmitting stations.

What is claimed is:

1. An optical transmission system comprising a plurality of transmitting stations having respective light sources for transmitting respective modulated optical signals as a transmission band by way of a single optical fiber and a receiving station having a detector for detecting the modulated optical signals and for converting the detected modulated optical signals to respective electrical signals, and a distributor for distributing the electrical signals to respective demodulators, characterized in that the light sources of the transmitting stations transmit optical signals having unique wavelengths, the transmitting stations each having means for changing a state of polarization of the modulated optical signal to adversely affect the transmission band to produce an optical beat in the detector that identifies the transmitting station.

2. An optical transmission system according to claim 1, characterized in that the means for changing a state of polarization comprises a magnetic station having a magnetic field.

3. An optical transmission system according to claim 1, characterized in that the state of polarization of light are changed by means of a plane of polarization modulator.

4. An optical transmission system according to claim 1, characterized in that the means for changing a state of polarization comprises means for applying a vibration to the optical fiber.

5. An optical transmission system according to claim 1, characterized in that, upon identifying the light sources of a transmitting station, the optical beats are made not to adversely affect the transmission band by changing the wavelengths of the light sources of the identified transmitting stations.

6. An optical transmission system according to claim 1, characterized in that the plurality of transmitting stations and the receiving station are linked together by way of bidirectional optical fibers so that the means for changing the state of polarization is conducted by using the optical fibers in the direction from the receiving station to the transmitting stations.

7. An optical transmission system comprising:

a plurality of transmitting stations, each transmitting station having a light source for transmitting an optical signal having a state of polarization over an optical fiber, and at least one magnetic station for selectively varying the state of polarization of the optical signal to provide a unique state of polarization; and, a receiving station having a detector that detects the optical signals and converts the optical signals to a respective electrical signal, the detector identifying a transmitting station based upon the unique state of polarization, the receiving station further having a distributor that distributes the electrical signal to a respective demodulator.

* * * * *